United States Patent
Chou et al.

(10) Patent No.: US 7,796,493 B2
(45) Date of Patent: Sep. 14, 2010

(54) CANTILEVER ON CANTILEVER STRUCTURE

(75) Inventors: Tsung-Kuan Allen Chou, San Jose, CA (US); Donald Adams, Pleasanton, CA (US); Robert Stark, Saratoga, CA (US)

(73) Assignee: Intel Corporation, Santa Clara, CA (US)

( * ) Notice: Subject to any disclaimer, the term of this patent is extended or adjusted under 35 U.S.C. 154(b) by 564 days.

(21) Appl. No.: 11/891,459

(22) Filed: Aug. 10, 2007

(65) Prior Publication Data

US 2009/0040911 A1 Feb. 12, 2009

(51) Int. Cl.
G11B 9/00 (2006.01)
(52) U.S. Cl. .......................... 369/126; 850/53
(58) Field of Classification Search .......... None
See application file for complete search history.

(56) References Cited

U.S. PATENT DOCUMENTS 5,276,672 A * 1/1994 Miyazaki et al. ............. 369/126
7,239,544 B2 * 7/2007 Chen et al. .................. 365/163
2006/0023606 A1 * 2/2006 Lutwyche et al. ........... 369/100

OTHER PUBLICATIONS

U.S. Appl. No. 11/731,304, filed Mar. 30, 2007, entitled "Seek-Scan Probe (SSP) Memory Including Mechanism For Track Correction," by Tsun-Kuan Allen Chou.
U.S. Appl. No. 11/725,647, filed Mar. 19, 2007, entitled "Seek-Scan Probe (SSP) Memory With Sharp Probe Tips Formed At CMOS-Compatible Temperatures," by John Heck.
U.S. Appl. No. 11/644,650, filed Dec. 21, 2006, entitled "Seek-Scan Probe (SSP) Including See-Saw Scan Probe With Redundant Tip," by Tsung-Kuan Allen Chou.
U.S. Appl. No. 11/824,465, filed Jun. 29, 2007, entitled "Forming A Cantilever Assembly For Vertical And Lateral Movement," by John Heck and Tsung-Kuan Allen Chou.

* cited by examiner

*Primary Examiner*—Paul Huber
(74) *Attorney, Agent, or Firm*—Trop, Pruner & Hu, P.C.

(57) ABSTRACT

In one embodiment, the present invention includes an apparatus having a first cantilever structure to move in a vertical direction, including a first plate formed of a conductive material, an insulation beam adapted on a portion of the first plate, and a second cantilever structure adapted on the insulation beam and including a second plate formed of a conductive material, where an air gap is present between the first and second plates. Other embodiments are described and claimed.

15 Claims, 7 Drawing Sheets

CANTILEVER ON CANTILEVER STRUCTURE

BACKGROUND

Seek-scan probe (SSP) memory is a type of memory that uses a non-volatile storage media as the data storage mechanism and offers significant advantages in both cost and performance over conventional charge storage memories. Typical SSP memories include storage media made of materials that can be electrically switched between two or more states having different electrical characteristics, such as resistance or polarization dipole direction.

SSP memories are written to by passing an electric current through the storage media or applying an electric field to the storage media. Passing a current through the storage media is typically accomplished by passing a current between a probe tip on one side of the storage media and an electrode on the other side of the storage media. Current SSP memories use probe tips positioned on the free end of one or more microelectromechanical systems (MEMS) probes. In an idle state each MEMS probe maintains the probe tip at a certain distance from the storage media, but before the electric field or current can be applied to the storage media the probe tip must usually be brought close to, or in some cases in direct contact with, the storage media.

In some SSP memories, to obtain a sufficient signal-to-noise ratio (SNR) for read/write/erase operations on the storage media, electrical circuitry such as amplifiers, signal processors, and so forth may be in close proximity to the MEMS probe. One way of achieving this proximity is to place the MEMS probes on a complementary metal oxide semiconductor (CMOS) wafer in or on which the needed circuitry has already been formed. Even doing so, SNRs may still be lower than desired owing to the electrical nature of the read process.

DETAILED DESCRIPTION

In various embodiments, a SSP cantilever structure with a cantilever capacitor may be provided to enable high-sensitivity capacitive piezoeresponse force microscopy (PFM) data reading. In some embodiments the SSP cantilever is suspended by a torsional beam, which is anchored to a substrate or another suspended platform (e.g., a lateral actuation structure), although the cantilever structure does not need to be a torsional beam type. The second cantilever structure may be created on one end of the SSP cantilever to form a sensing capacitor, Cs, with a small air gap. The air gap, do, between the sense cantilever and main cantilever body (i.e., a cantilever carrier) determines the sense capacitance, Cs. This air gap can be controlled by the cantilever fabrication process with a sacrificial layer. Embodiments thus allow a small air gap which leads to larger sense capacitance. The cantilever reading/writing tip may be located on the sense capacitor instead of on the main cantilever body. The capacitor, Cs, serves as the sense capacitor for PFM sensing during data reading.

Figure 1:
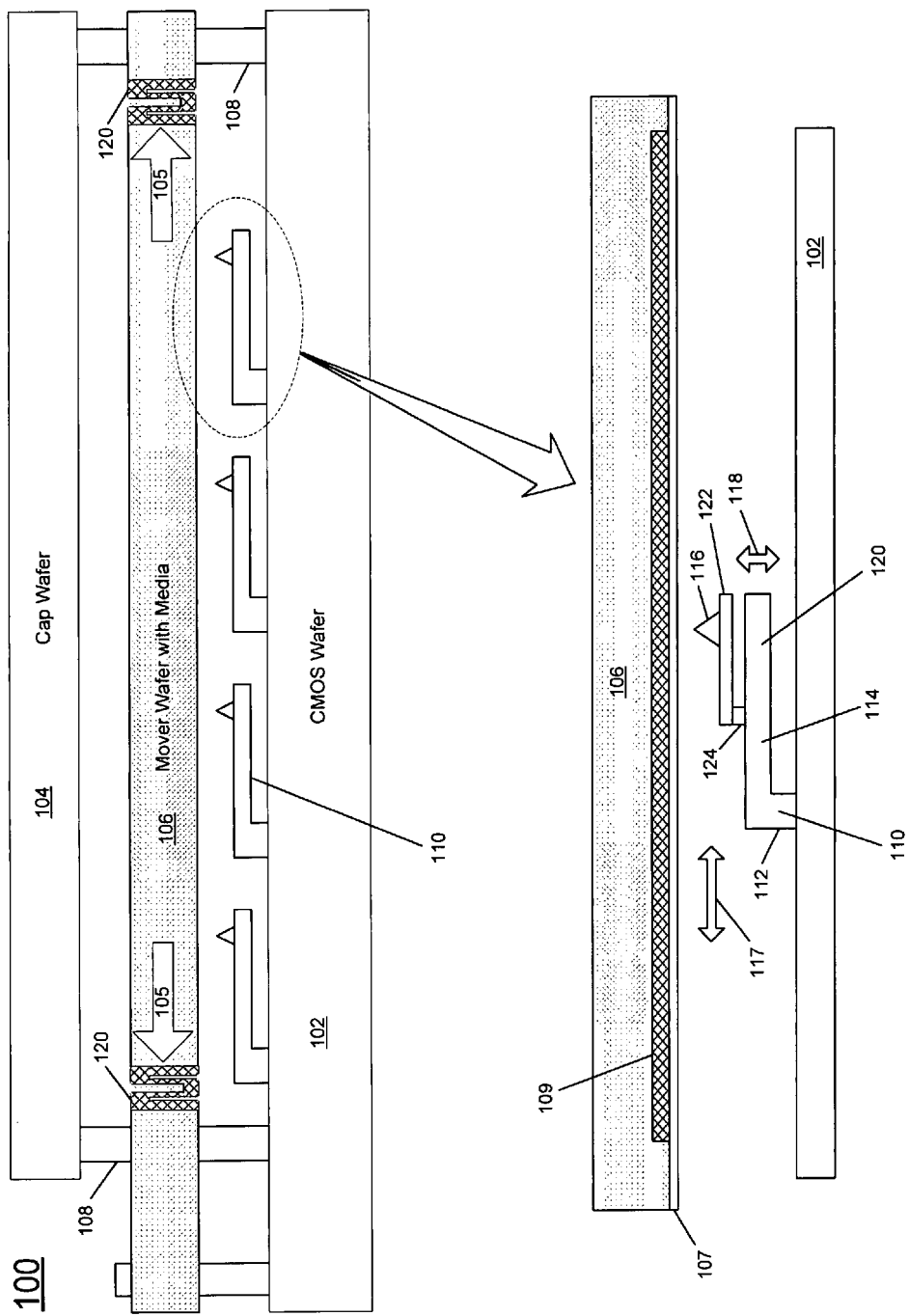
FIG. 1 is a block diagram of a memory device in accordance with one embodiment of the present invention.

FIG. 1 illustrates an embodiment of a SSP memory 100. SSP memory 100 includes a CMOS wafer 102 over which a cap wafer 104 is positioned and supported by supports 108. Together, supports 108 and cap wafer 104 form a sealed enclosure within which a mover wafer 106 is suspended, also from supports 108, such that is it substantially parallel to the surface of CMOS wafer 102. As illustrated by arrows 105, mover wafer 106 is capable of motion relative to CMOS wafer 102 in a plane substantially parallel to the surface of the CMOS wafer (i.e., the x-y plane). One or more MEMS probes 110 are formed on a surface of CMOS wafer 102 so that the sharpened tip 116 of each MEMS probe 110 can come close to, or make contact with, the lower surface of mover wafer 106 when MEMS probes 110 are deflected vertically, as illustrated by arrow 118. As shown in FIG. 1, in various embodiments tip 116 may be adapted on a cantilever capacitor structure to enable PFM reading of data on mover wafer 106. That is, a drive signal applied to tip 116 may cause PFM contraction and extension of storage media on mover wafer 106, which is then sensed by the capacitor cantilever. Further as shown in FIG. 1, embodiments may include lateral movement of MEMS probe 110, as illustrated by arrow 117.

In addition to supporting the other components of SSP memory 100, CMOS wafer 102 can include therein circuitry that controls the operation of memory 100. Examples of circuitry that can be contained on CMOS wafer 102 include activation electrodes (not shown) that cause MEMS probes 110 to deflect upward toward mover wafer 106 and laterally; circuitry to send signals to sharpened tip 116 so that it can write data into storage media 107 on mover wafer 106; sensing and amplifying circuitry to receive, condition and amplify signals received from sharpened tip 116 when it reads data from storage media 107; memory to buffer and/or store data read from or written to, storage media 107; logic circuitry and/or software to encode and/or decode data that is written to or read from the storage media on mover wafer 106; and so forth.

As noted above, cap wafer 104 is supported over CMOS wafer 102 by supports 108. Together with supports 108, cap wafer 104 forms an enclosure within which mover wafer 106, cantilever probes 110, and other components of SSP memory 100 are housed.

Mover wafer 106 carries the storage media 107 on which SSP memory 100 writes data and from which it reads data. Mover wafer 106 can also include other elements such as electrode 109, which may be a media electrode, between storage media 107 and wafer 106 that facilitates reading and writing of data on storage media 107. Mover wafer 106 is supported between cap wafer 104 and CMOS wafer 102 by a suspension 120 coupled to supports 108. Suspension 120 provides electrical connections to the mover wafer and allows the mover wafer to move substantially parallel to the CMOS wafer, enabling memory 100 to change the x-y position at which the sharpened tips 116 of MEMS probes 110 read and write data to and from storage media 107. To enable mover wafer 106 to move in the x-y plane, SSP memory 100 also includes a drive mechanism (not shown) coupled to the mover wafer. In one embodiment, mover wafer 106 is composed of a single-crystal silicon, although in other embodiments polysilicon, silicon germanium ($Si_xGe_y$) or other variant of silicon may be used. Mover wafer 106 has a layer of storage media 107 deposited thereon on the surface of the wafer that faces MEMS probes 110. In one embodiment, storage media 107 is a ferroelectric material, although in other embodiments it can be a different type of material such as a chalcogenide or polymer material.

MEMS probes 110 are integrally formed on a surface of CMOS wafer 102. Although the illustrated embodiment shows the MEMS probes as cantilever-type probes, other embodiments can use other types of probes, such as see-saw-type probes; still other embodiments can include combinations of different types of probes. Each cantilever MEMS probe 110 includes a support or pedestal 112 formed on the surface of CMOS wafer 102 and a beam 114 that includes a fixed end attached to pedestal 112 and a free end opposite the fixed end. In the embodiment shown the beam 114 and pedestal 112 are integrally formed of the same material, but in other embodiments beam 114 and pedestal 112 need not be formed integrally and need not be formed of the same material. Examples of materials that can be used for pedestal 112 and/or beam 114 include polysilicon, single-crystal silicon, silicon germanium ($Si_xGe_y$), other materials not listed here, or combinations of materials. In one embodiment, the cantilever elements may be formed of polysilicon germanium (poly SiGe), as its processing temperature is compatible with CMOS wafer 102.

Each MEMS probe 110 includes a sharpened tip 116 at or near the free end of a sense capacitor cantilever formed of a pair of plates 120 and 122 (one of which may be part of beam 114), adapted on either side of an insulator 124 formed on beam 114 such that when the free end of plate 122 is deflected toward storage media 107 a current can be passed through sharpened tip 116 to write data bits into the storage media. Reading of stored data may occur by PFM reading using the sense capacitor formed of the capacitor cantilever. Thus each tip 116 and its corresponding sense capacitor are electrically coupled via beam 114 and pedestal 112, or via electrical traces in beam 114 and pedestal 112, to circuitry within CMOS wafer 102 that can read, write, amplify, decode, and perform other operations on data written to or read from storage media 107 by sharpened tip 116 and the sense capacitor cantilever. In one embodiment each tip 116 is formed of amorphous silicon, although in other embodiments other types of materials can be used. Note that in some embodiments tip 116 may be coated with a conductive and wear-resistant material, such as platinum, although other materials may be used.

Cantilever MEMS probe 110 is electrically grounded in order to be vertically actuated by a bottom actuation electrode. In one embodiment, cantilever MEMS probe 110 is grounded while the two electrodes (120 and 122) of the sense capacitor (if isolated from MEMS probe 110) can be individually biased for different sensing electronic configuration. When a voltage is applied to the actuation electrode, electrostatic force rotates the see-saw beam until its tip contacts the ferroelectric media surface above. When an alternating current (AC) drive signal is applied to tip 116, piezoresponse force modulation causes the ferroelectric media to contract and extend. As a result, the PFM drive signal modulates tip displacement (ddo) and capacitance change, dCs, on the sense cantilever. In order to maximize the PFM-modulated capacitance, the drive signal frequency can be set close to the sense cantilever resonant frequency. In various embodiments, the sense cantilever can be designed with a much stiffer structure than cantilever MEMS probe 110 for high fundamental resonant frequency (e.g., 1 megahertz (MHz)) in high-speed PFM reading. Meanwhile, since the sensing cantilever has much higher stiffness, its resonant frequency will not be affected by the vertical actuation and contact of the cantilever.

While the scope of the present invention is not limited in this regard, some embodiments may provide a capacitance area of between approximately 50 microns ($\mu m$)-150 $\mu m$ by approximately 25 $\mu m$-75 $\mu m$. Sensitivity may increase by greater than 30 times when an air gap between the capacitor plates is reduced from 1 um to 0.25 um. Therefore, fast reading can be achieved with smaller data bits and higher signal-to-noise ratio.

Figure 2A:
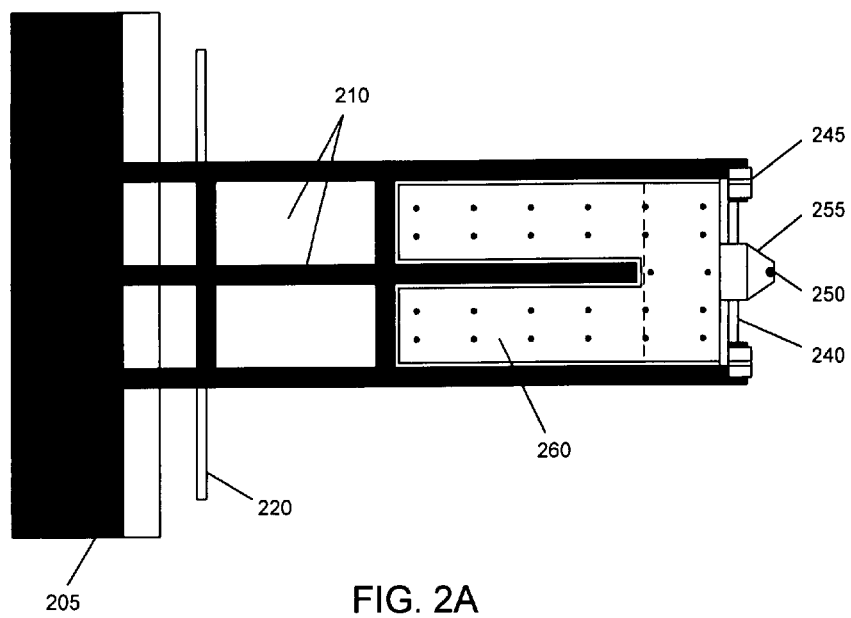
FIGS. 2A-2D are top and cross-sectional views of cantilever assemblies in accordance with embodiments of the present invention.
Figure 2B:
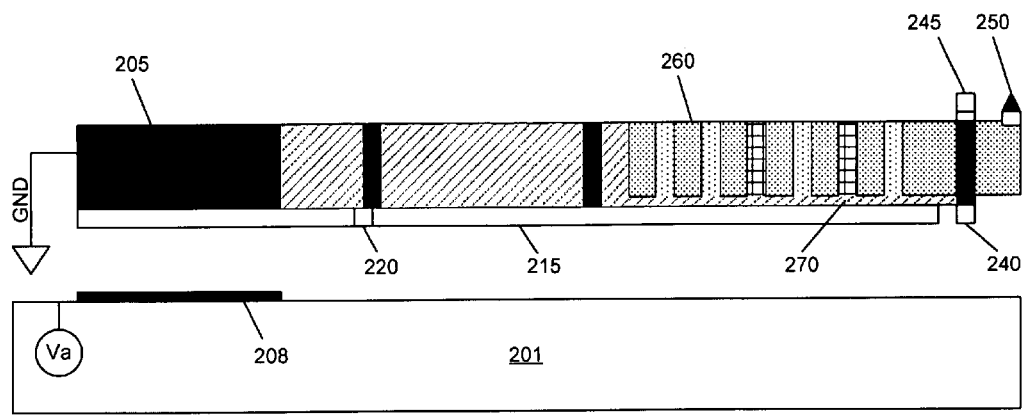

Referring now to FIGS. 2A and 2B, shown are top and cross-sectional views of a cantilever assembly in accordance with an embodiment of the present invention formed on a substrate 201, which in various embodiments may include CMOS circuitry as described above. As seen, a PFM see-saw sense electrode structure (generally including elements 250, 240, 245, 255 and 260) is isolated from the SSP cantilever body (generally including elements 205, 210, 215, and 220). Specifically, the PFM sense electrode structure includes a capacitor formed of an isolated top electrode 260 and a bottom plate 215 (which is of the SSP cantilever body), along with a PFM torsional beam 240 that is supported by a torsional beam support 245. A top electrode 255 is adapted at an end of the PFM cantilever structure, as shown in FIG. 2A. In turn, the SSP cantilever body may include a support 205, adapted above a vertical actuation electrode 208, and to which a main cantilever 210 is coupled to provide for lever movement over a torsional beam 220.

Note that the main cantilever also acts as a bottom electrode plate 215 of the sense capacitor. Bottom plate 215 is electrically grounded together with cantilever body 210 for vertical actuation. Top PFM electrode 260 is suspended above bottom plate 215 by a very small gap (approximately 0.2 um), with torsional beam 240 of the PFM electrode structure connected to main cantilever body 210. PFM torsional beam 240 is also electrically isolated from SSP cantilever body 210 through a torsional beam support bridge 245 as seen in FIGS. 2A and 2B. PFM torsional beam 240 is much stiffer compared to torsional beam 220 of the main see-saw cantilever. As a result, the sense cantilever has a much higher fundamental resonant frequency (e.g., greater than 500 kilohertz (kHz) compared to approximately 15 kHz of the main cantilever). This higher sense capacitor resonant frequency enables faster data acquisition.

Figure 3A:
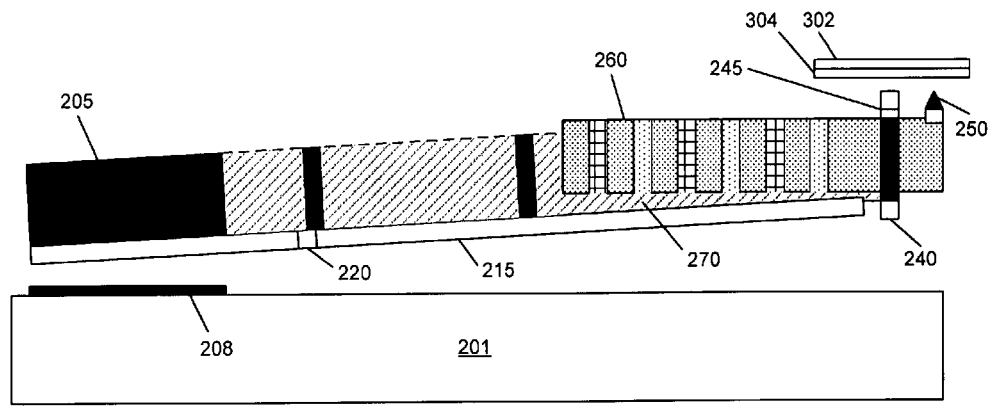
FIGS. 3A and 3B are cross-sectional views of a cantilever assembly in accordance with another embodiment of the present invention.

When an actuation voltage is applied to bottom actuation electrode 208, the main SSP cantilever body 210 rotates and makes tip contact to a surface of a storage media 304 with a desired contact force as shown in FIG. 3A. There is no need to bias a media electrode 302, in various embodiments, and thus a media electrode 302 of the mover wafer is commonly grounded. Separate data (e.g., input/output (IO)) traces are connected to see-saw sense electrode 260 and cantilever tip 250 for PFM reading, as described below. When the PFM drive signal is applied to tip 250, piezoelectric modulation induces tip vibration of sense electrode 260.

Figure 3B:
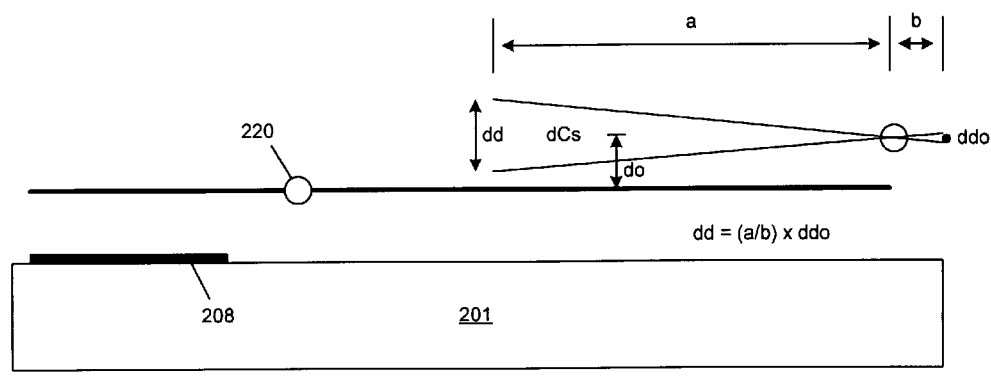

Due to uneven cantilever design, the PFM tip displacement is mechanically magnified with cantilever electrode 260 on the other side of torsional beam 240 as shown in FIG. 3B. A PFM tip displacement of ddo is amplified to an equivalent capacitor gap displacement of ~ddo*(a/b), where a is the length of the see-saw lever (i.e., sense electrode 260) on the sense electrode side and b is the length of the lever on the tip side. When the PFM drive signal is tuned to the resonant frequency of the PFM cantilever, the modulated displacement may be maximized. For (a/b) ratio of 10 (e.g., 50 um/5 um), the PFM signal can be magnified by 10 times. With a small see-saw air gap in the sense capacitor (e.g., 0.2 um), the sensitivity may be approximately 30 times that of sense capacitor with a 1 um gap. As a result, embodiments having a small sensing gap can be approximately 300 times more sensitive than a non-see-saw sense capacitor with a 1 um air gap.

Figure 4A:
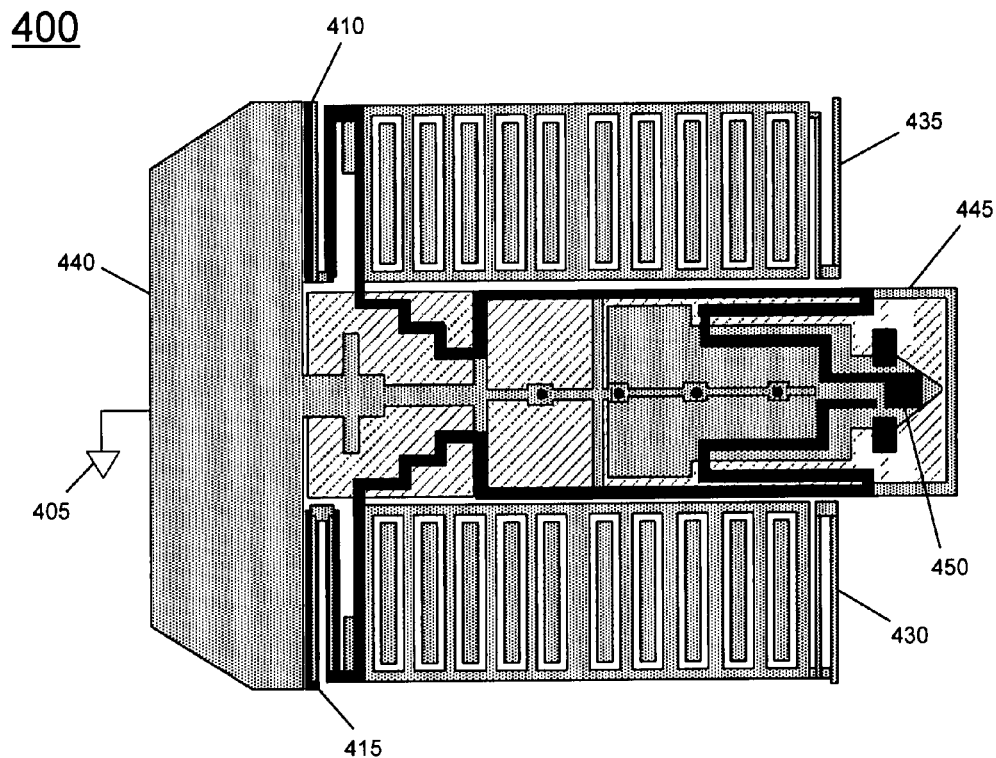
FIGS. 4A and 4B are a structural layout of an amplified cantilever in accordance with an embodiment of the present invention.
Figure 4B:
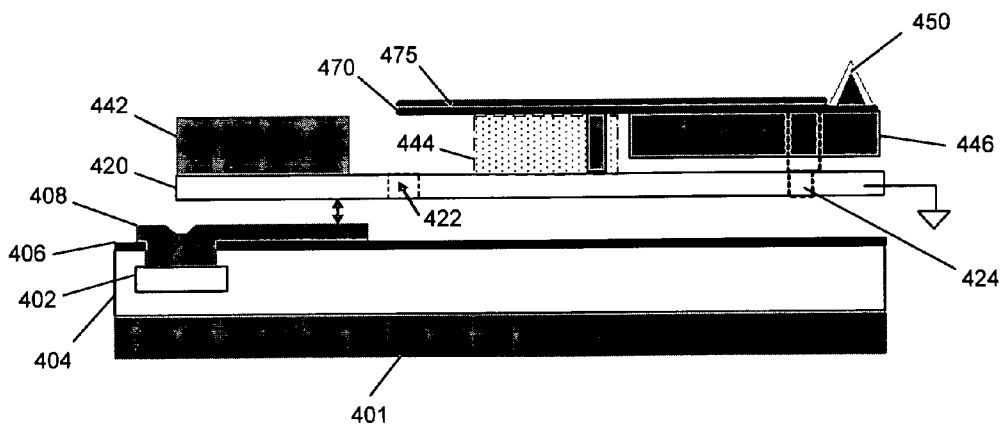

Referring now to FIGS. 4A and 4B, shown is a structural layout of an amplified PFM SSP cantilever in accordance with an embodiment of the present invention. As shown in FIG. 4A, the full suspended cantilever structure contains three terminals, namely a ground to cantilever body/bottom plate trace 405, a PFM drive to cantilever tip trace 410, and a data to suspended see-saw electrode trace 415 on the main cantilever body. This structure can be fabricated in various manners, such as by forming the cantilever structures using thick layers of a sacrificial oxide material with a trench refill process to fill resulting trenches formed therein, or by forming various thick layers of a polysilicon or other such material and then patterning and filling trenches therein to form cantilever structures.

As shown in FIG. 4B, which is a cross-sectional view of the structure of FIG. 4A, various signal traces are coupled throughout structure 400. Specifically, structure 400 as shown in FIG. 4A includes a support structure to which SSP cantilever body 440 is coupled, which may be supported by lateral actuation structures 430 and 435. In turn, sense cantilever 445 is adapted between these lateral actuation structures, and tip 450 is adapted at a distal portion of sense cantilever 445. Note the various traces shown in FIG. 4A include a ground trace 405 and a PFM drive signal trace 410, which is coupled between a PFM drive circuit (not shown in FIG. 4A) and sense cantilever 445. Note that signal trace 410 is suspended at various portions as it meanders to sense cantilever 445. Similarly, a sensing signal trace 415 is also suspended as it meanders from sense circuitry (not shown in FIG. 4A) to sense cantilever 445. In order to provide functional see-saw actuation and sensing, sense traces 415 may be partially suspended above torsional beam 422. Various meander shapes of suspended traces can be designed, such as folded or stepped trace routing as shown in FIG. 4A. The suspended meander trace design reduces its effect on the torsional beam stiffness drift and, thus a precise control on the main cantilever actuation and sense cantilever resonant frequency can be achieved.

Shown in FIG. 4B is a cross-sectional view of a more fully integrated cantilever assembly in accordance with an embodiment of the present invention, showing additional elements and structures present in accordance with one embodiment. Specifically, as shown in FIG. 4B, structure 400 may include a CMOS wafer 401 including multiple layers of CMOS circuitry formed on a substrate such as a silicon wafer. Shown specifically in the embodiment of FIG. 4B is a top metal layer 402 which may include, for example, connections to provide interconnection between a cantilever structure formed thereon and underlying circuitry such as amplifier circuitry, processing circuitry, logic circuitry and so forth. Over this top metal layer 402 a protection layer 404, which may be an oxide layer, is formed and patterned to expose the desired contacts in top layer 402.

Then as shown in FIG. 4B, a dielectric layer 406, which may be formed of a relatively thin layer of polysilicon carbide (SiC) may be deposited and patterned for further protection on the buried material underneath. Over ground plane layer 406, as shown in FIG. 4B, a vertical actuation electrode 408 along with electrical contacts to various signal traces of top metal layer 402 may be formed.

Then a cantilever layer 420, which may be SiGe, and may include a portion 422 and a portion 424 which correspond to seesaw torsional beams for the SSP cantilever and the sense cantilever, respectively may be formed. Then a relatively thick layer may be formed to provide a full stack for an actuation structure. In various embodiments, this layer may be approximately 3 microns thick, although the scope of the present invention is not limited in this regard. This layer may be patterned to form various actuation structures and then contacts to enable a cantilever structure ground electrodes and a data and control electrodes to enable read, write and erase operations may be formed. This layer may include a vertical actuation structure 440, which may include a first fin stiffener 442 and a second fin stiffener 444, which are formed on opposing sides over seesaw torsional beam 422. Also formed is sense electrode 446 with an air gap over a bottom plate formed of cantilever layer 420.

Above this structure, a trace isolation dielectric and a tip layer may be deposited. The tip layer may then be patterned, e.g., using a tip undercut etch to obtain a probe tip, which may then be sharpened using an annealing process such. Such trace dielectric layer may also serve as a tip etch stop and protection layer during the tip sharpening process. After tip formation, the trace dielectric layer may be patterned to provide a trace dielectric layer 470 which acts as a base for a suspended data trace layer 475.

Figure 2C:
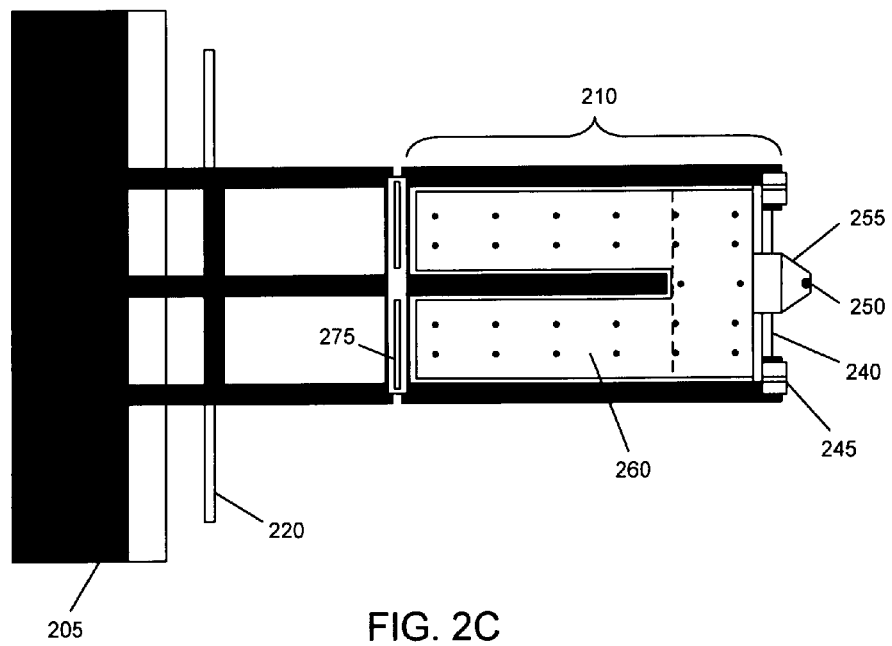
Figure 2D:
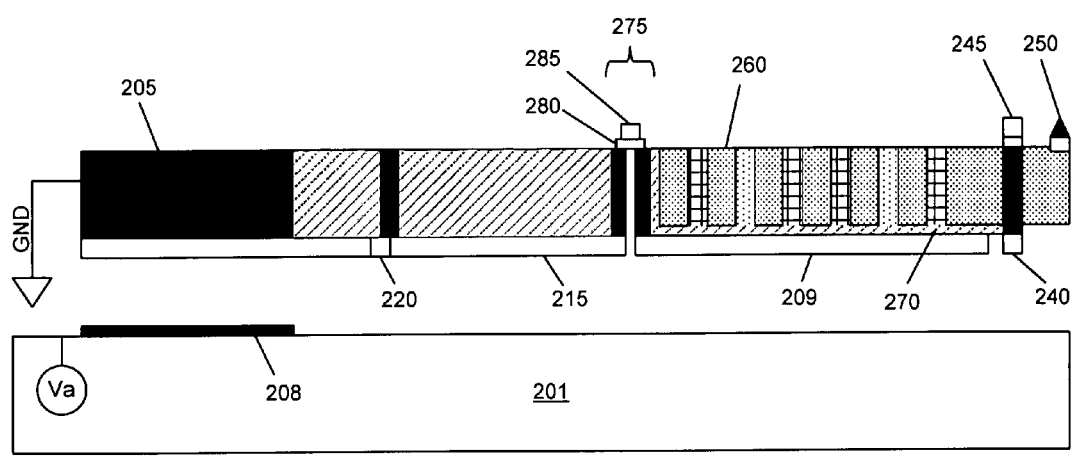

Referring back to FIGS. 2C and 2D, shown is an alternative embodiment of an amplified see-saw sense capacitor on a SSP cantilever. As shown in FIG. 2D, bottom plate 209 of the sense capacitor is completely isolated from grounded cantilever body 215 in this embodiment. This bottom plate also forms an individual cantilever from the main cantilever body to support the sense electrode 260. As a result, the sense capacitor can be viewed as a stand-alone cantilever capacitor attached to the SSP cantilever structure. An electrically isolated bridge structure 275 formed of isolation layers 280 and 285 is used to connect the sense cantilever to the main SSP cantilever (similar to torsional beam support bridges 245 on the sense structure itself). Bridge structure 275 may be designed to be very stiff to achieve minimum deformation during data actuation contact and data read/write. With electrically isolated bottom plate 209 on the sense capacitor, this embodiment provides a flexible advantage to biasing bottom plate 209 at different potentials, differential electronic sensing, or any electronic sensing configurations in which the bottom plate is not permanently grounded, for better PFM data reading technique.

Figure 5A:
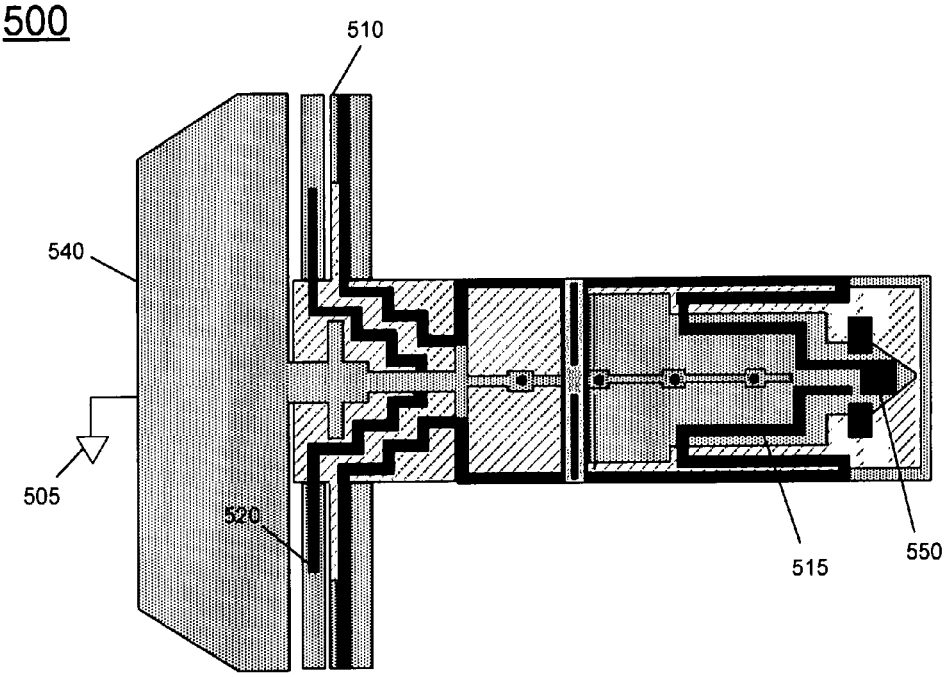
FIGS. 5A and 5B are a structural layout of an amplified cantilever in accordance with another embodiment of the present invention.
Figure 5B:
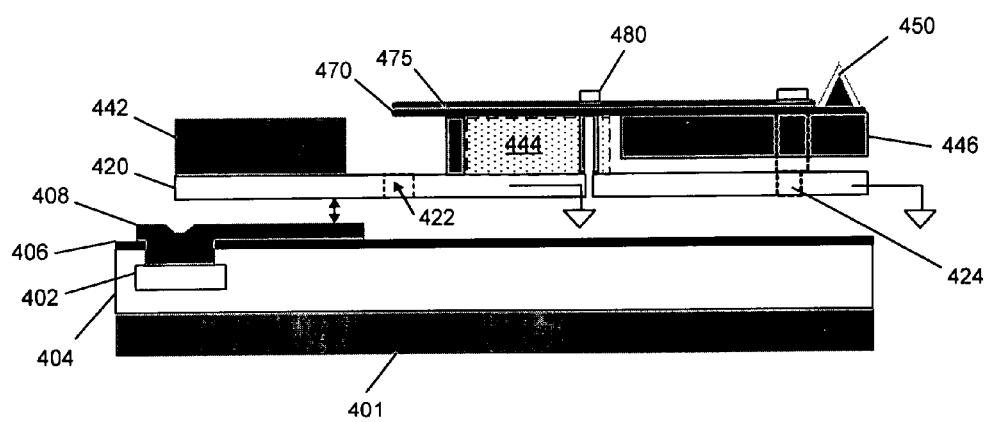

FIGS. 5A and 5B show a structural layout of an amplified PFM SSP cantilever in accordance with an embodiment of the present invention having an isolated see-saw sense capacitor. Such suspended cantilever structure contains four terminals (compared to three in the embodiment shown in FIGS. 4A and 4B). Specifically, these traces include a ground to cantilever body trace 505, a PFM drive to cantilever tip trace 510, an IO to suspended sense capacitor trace 515, and an IO to sense capacitor bottom plate trace 520. Similar to the structure shown in FIGS. 4A and 4B, all IO traces may be partially suspended at critical regions around the torsional beams. Thus an additional IO trace is electrically connected to bottom plate 209 of the sense capacitor, which may be enabled by a separate suspended trace 520 near SSP cantilever torsional beam 422. FIG. 5B shows a cross-section in which common reference numerals with FIG. 4B correspond to similar structures, and in which bridge support 480 supports and electrically isolates the sense cantilever from the SSP cantilever. This embodiment may be fabricated using processes such as described above. While shown with this particular implementation in the embodiment of FIGS. 5A and 5B, the scope of the present invention is not limited in this regard and MEMS probes may take other configurations in different embodiments.

Figure 6:
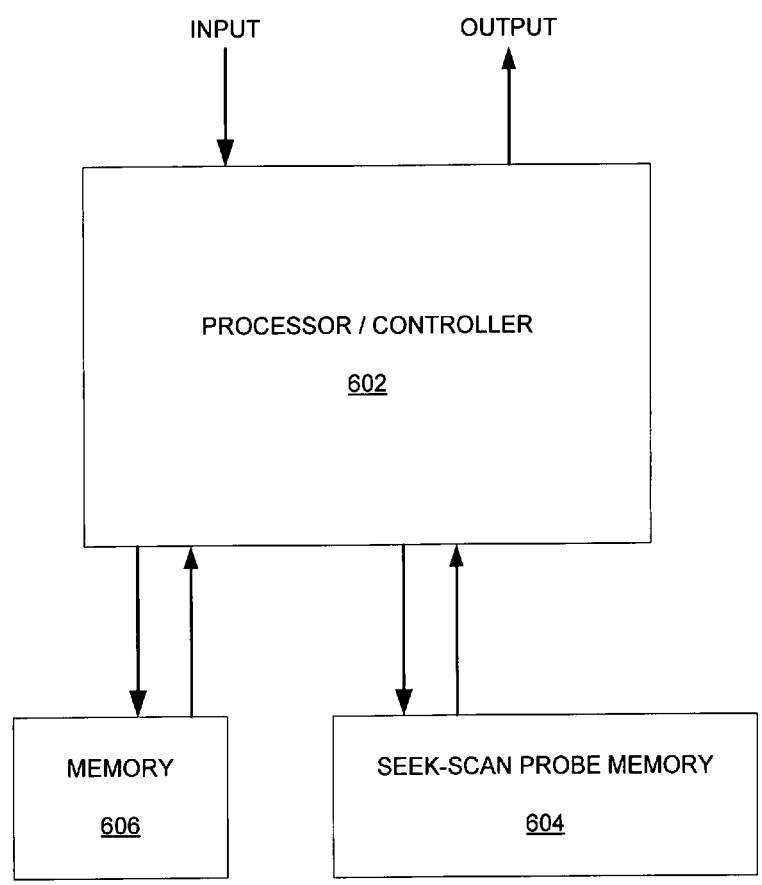
FIG. 6 is a block diagram of a system in accordance with one embodiment of the present invention.

FIG. 6 illustrates an embodiment of a system 600 that includes a SSP memory using one or more MEMS probes. System 600 includes a processor 602 to which is coupled a memory 606 and an SSP memory 604. Processor 602, in addition to being coupled to memories 604 and 604, has an input and an output through which it can receive and send data, respectively. In one embodiment processor 602 can be a general-purpose microprocessor, although in other embodiments processor 602 can be another type of processor, such as a programmable controller or an application-specific integrated circuit (ASIC).

Memory 606 can be any type of volatile or non-volatile memory or storage. Volatile memories that can be used in different embodiments of memory 606 include random access memory (RAM), dynamic random access memory (DRAM), synchronous random access memory (SRAM) and synchronous dynamic random access memory (SDRAM), erasable programmable read only memory (EPROM), electrically erasable programmable read only memory (EEPROM), and the like. SSP memory 604 can, in different embodiments, be a memory that includes one or more MEMS probes formed in accordance with an embodiment of the present invention.

In operation of system 600, processor 602 can receive and send data through its input and output, and can both read and write data to both the memory 606 and the SSP memory 604. Through appropriate software, processor 602 can control the reading, writing and erasure of data in SSP memory 604 by selectively changing the relevant media property (phase change, electric dipole formation, etc) of the storage media used in the SSP memory.

By using embodiments of the present invention, PFM reading in ferroelectric media may be realized without the need for laser beam deflection amplification. Because embodiments implement capacitive PFM sensing onto a SSP design and mechanically amplify the PFM signal to provide highest signal to noise ratio, such laser amplification can be avoided. Embodiments may further provide for good sensitivity to PFM signals and provide for high-density data reading (of very small data bits) for SSP applications.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. An apparatus comprising:
a first cantilever structure to move in a vertical direction, including a first plate formed of a conductive material;
an insulation beam adapted on a portion of the first plate; and
a second cantilever structure adapted on the insulation beam to move in the vertical direction, the second cantilever structure including a second plate formed of a conductive material, wherein an air gap is present between the first and second plates.

2. The apparatus of claim 1, further comprising a probe tip adapted on the second plate, the probe tip to read and write data from and to a media wafer including a ferroelectric media surface.

3. The apparatus of claim 2, wherein the first and second plates form a sense capacitor to read the data from the media wafer.

4. The apparatus of claim 2, further comprising a drive trace coupled to the second plate to provide a drive signal to the probe tip, wherein the drive trace is suspended above at least a portion of the first cantilever structure.

5. The apparatus of claim 4, wherein the drive trace is to provide the drive signal to the probe tip substantially at a resonant frequency of the second cantilever structure.

6. The apparatus of claim 5, wherein the resonant frequency of the second cantilever structure is substantially greater than a resonant frequency of the first cantilever structure.

7. The apparatus of claim 6, wherein the first plate and the first cantilever structure are electrically commonly coupled to enable movement in the vertical direction.

8. The apparatus of claim 1, further comprising a beam support bridge to support a torsional beam of the second cantilever structure, wherein the second cantilever structure is to pivot about the torsional beam.

9. The apparatus of claim 8, wherein the second plate of the second cantilever structure is adapted on the torsional beam such that a ratio between a first portion of the second cantilever structure extending from the torsional beam in a first direction and a second portion of the cantilever structure extending from the torsional beam in a second direction opposite the first direction exceeds one.

10. The apparatus of claim 9, wherein the ratio is approximately 10.

11. The apparatus of claim 9, wherein the ratio of the first and second portions are to enable mechanical amplification of piezoresponse force microscopy (PFM) displacement of the probe tip.

12. A system comprising:
a media wafer including a ferroelectric medium layer and a common electrode layer;
a substrate including complementary metal oxide semiconductor (CMOS) circuitry;
a microelectromechanical systems (MEMS) probe formed on the substrate and movable to a location adjacent the ferroelectric medium layer, the MEMS probe including:
a first cantilever structure to move in a vertical direction and having a first plate formed of a conductive material;
a second cantilever structure adapted above a portion of the first cantilever structure to move in the vertical direction, the second cantilever structure having a second plate formed of a conductive material; and
a probe tip adapted on the second plate, the probe tip to read data from the ferroelectric medium layer by piezoresponse force microscopy (PFM).

13. The system of claim 12, wherein a resonant frequency of the second cantilever structure is substantially greater than a resonant frequency of the first cantilever structure, and the first and second plates form a sense capacitor to read the data, wherein a capacitance of the sense capacitor is based at least in part on an air gap between the first and second plates.

14. The system of claim 12, further comprising a drive trace coupled to the second plate to provide a drive signal to the probe tip, wherein the drive trace is suspended above at least a portion of the first cantilever structure and wherein the drive trace is to provide the drive signal to the probe tip substantially at a resonant frequency of the second cantilever structure.

15. The system of claim 12, wherein the second plate of the second cantilever structure is adapted on a torsional beam located on the first plate of the second cantilever structure such that a ratio between a first portion of the second cantilever structure extending from the torsional beam in a first direction and a second portion of the cantilever structure extending from the torsional beam in a second direction opposite the first direction exceeds one.

* * * * *